United States Patent [19]

Yamashita

[11] 4,323,045
[45] Apr. 6, 1982

[54] FLOW CONTROL DEVICE FOR EXHAUST GAS RECYCLING SYSTEM

[75] Inventor: Ryuichi Yamashita, Hamamatsu, Japan

[73] Assignee: Yamaha Hatsudoki Kabushiki Kaisha, Iwata, Japan

[21] Appl. No.: 98,867

[22] Filed: Nov. 30, 1979

[30] Foreign Application Priority Data

Nov. 30, 1978 [JP] Japan ................................ 53-148080

[51] Int. Cl.³ .......................................... F02M 25/06
[52] U.S. Cl. .................................................. 123/570
[58] Field of Search ......................... 123/570, 568, 571

[56] References Cited

U.S. PATENT DOCUMENTS

| | | | |
|---|---|---|---|
| 1,371,397 | 3/1921 | Ricardo | 123/570 |
| 2,419,747 | 4/1947 | Wassman | 123/570 |
| 2,421,406 | 6/1947 | Bicknell | 123/570 |
| 2,645,216 | 7/1953 | Campbell | 123/570 |
| 2,851,021 | 9/1958 | Covone | 123/570 |
| 2,977,940 | 4/1961 | Theriault | 123/570 |
| 3,512,509 | 5/1970 | Daigh | 123/568 |
| 3,915,133 | 10/1975 | Nohira | 123/570 |
| 4,071,003 | 1/1978 | Aono | 123/571 |
| 4,147,141 | 4/1979 | Nagano | 123/570 |
| 4,191,147 | 3/1980 | Yuuki | 123/568 |

*Primary Examiner*—Wendell E. Burns
*Attorney, Agent, or Firm*—Ernest A. Beutler

[57] ABSTRACT

Several embodiments of exhaust gas recirculation systems for internal combustion engines. In each embodiment an arrangement is provided for cooling at least a portion of the recirculated exhaust gases during at least some running conditions prior to reintroduction into the combustion chamber. In one embodiment, the cooled exhaust gases are mixed with uncooled exhaust gases to provide the desired temperature of exhaust gas recirculation. In another embodiment, the exhaust gases are cooled by a fan that is operated in response to the engine running condition. In addition, a device is incorporated for controlling the cooling of the exhaust gases in response to engine temperature.

7 Claims, 4 Drawing Figures

FLOW CONTROL DEVICE FOR EXHAUST GAS RECYCLING SYSTEM

BACKGROUND OF THE INVENTION

This invention relates to an exhaust gas recycling device for an internal combustion engine and more particularly to an improved control for exhaust gas recirculation.

In connection with controlling the emission of unwanted exhaust gas constituents from internal combustion engines, it is a widely adapted technique to recirculate a portion of the exhaust gases back to the combustion chambers. Such exhaust gas recirculation (EGR) has the effect of reducing the temperature in the combustion chamber and, accordingly, the emission of nitrous oxides. It has been the practice to reintroduce the exhaust gases into the induction system for mixing with the intake charge prior to induction into the combustion chambers. However, the induction system vacuum varies considerably with engine load and, therefore, the effective control of the amount of exhaust gas recirculation is seriously hampered. Furthermore, the introduction of the exhaust gases into the intake system has a tendency to create a higher than desired degree of exhaust gas recirculation at low loads and a lower than desirable degree of exhaust gas recirculation at high loads. Furthermore, due to the elevated temperature of the exhaust gases, the exhaust gas recirculation has a tendency to cause the engine to run hotter than desired and also tends to create unnecessarily high temperatures in the combustion chamber under certain conditions.

It is, therefore, a principal object of this invention to provide an improved device for controlling exhaust gas emissions through the use of exchaust gas recirculation.

SUMMARY OF THE INVENTION

A first feature of this invention is adapted to be embodied in an internal combustion engine having a chamber of variable volume in which combustion occurs, an induction system for delivering a charge to the chamber and an exhaust system for exhausting spent exhaust gases from the chamber. An emission system is also incorporated for receiving at least a portion of the products generated during the operation of the engine and returning these products to the chamber. In accordance with this feature of the invention, means are provided for cooling the recycled products prior to return to the chamber.

Another feature of the invention is also adapted to be embodied in an engine as described in the preceding paragraph. In accordance with this feature of the invention, the recirculation of the products is controlled by means that are responsive to the temperature of the engine.

DETAILED DESCRIPTION OF THE PREFERRED EMBODIMENTS

Figure 1:
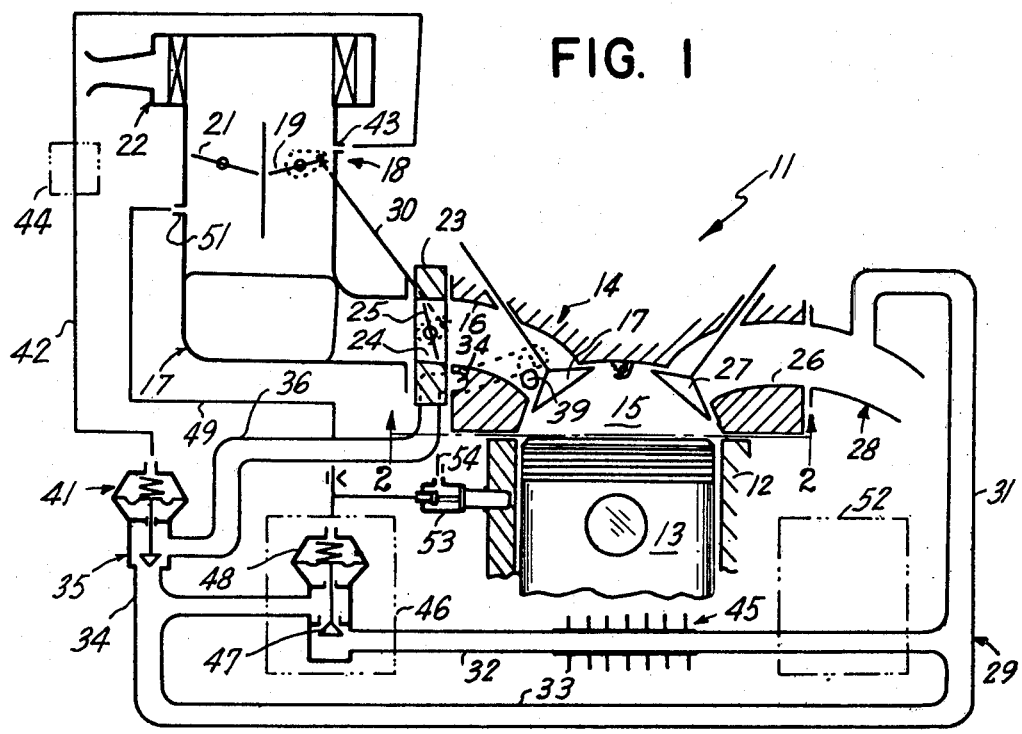
FIG. 1 is a partially schematic cross-sectional view taken through a portion of an internal combustion engine constructed in accordance with a first embodiment of the invention.
Figure 2:
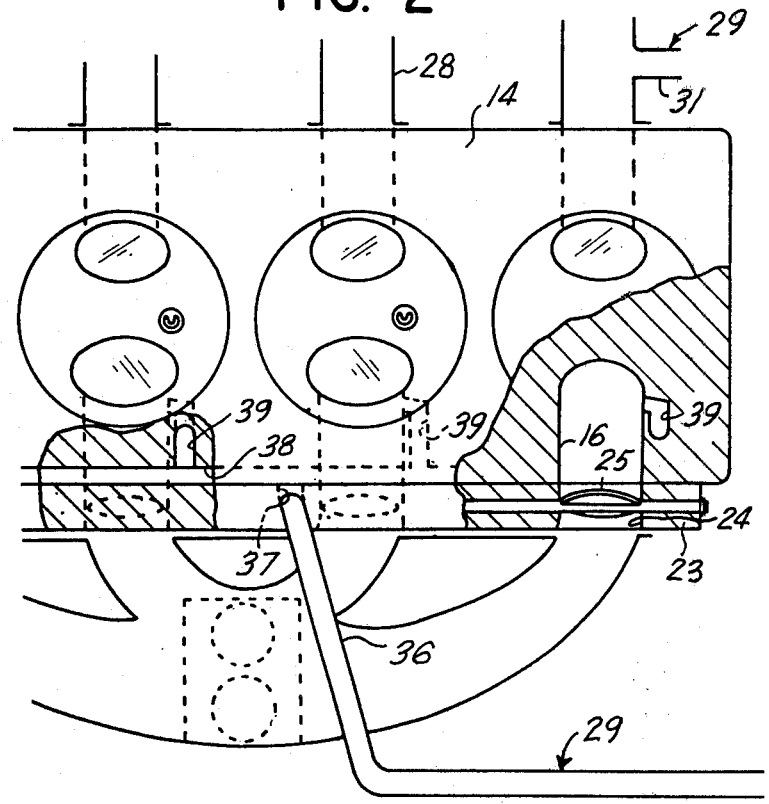
FIG. 2 is an enlarged view showing the underside of the cylinder head in the embodiment of FIG. 1 and is taken generally in the direction of the line 2—2 of FIG. 1. In this view, certain portions are broken away so as to more clearly show the construction.

Referring first to FIGS. 1 and 2, an internal combustion engine constructed according to a first embodiment of this invention is identified generally by the reference numeral 11. The engine 11 includes a cylinder block 12 having a number of cylinder bores in which pistons 13 are supported for reciprocation. The pistons 13 are connected to a crankshaft via connecting rods in a known manner (not shown). A cylinder head, indicated generally by the reference numeral 14, is affixed to the cylinder block 12 in a known manner and has a number of chambers 15 that cooperate with each of the cylinder bores and pistons 13 to provide chambers of variable volume in which combustion occurs. These chambers will, at times, be referred to as combustion chambers.

The cylinder head 14 is provided with intake passages 16 for each of the chambers 15 and intake valves, illustrated schematically at 17, control the communication between the intake passages 16 and the chambers 15. The intake valves 17 are operated in any known manner. The intake passages 16 are served by an intake manifold, indicated generally by the reference numeral 17, and a charge is delivered to the manifold 17 from a carburetor shown schematically at 18. The carburetor 18 is depicted as being of the two barrel or staged type and has a primary throttle valve 19 which is manually operated in any known manner and a secondary throttle valve 21 which is also operated in any manner common with this type of carburetor. An air cleaner 22 is affixed to the carburetor 18 as is well known.

A valve plate 23 is interposed between the intake manifold 17 and the cylinder head 14. The valve plate 23 has a number of bores 24 equal in number to the number of cylinder head intake passages 16, which bores are aligned with these passages. A butterfly type throttle valve 25 is positioned in each bore 24. The throttle valves 24 are all fixed to a common shaft which shaft is operated by means of a link 30 that is connected to the primary throttle valve 19 so as to be operated in unison with it. The valves 25 have an initial degree of opening so that the effective air flow passage through each of them will be equivalent to the total intake air requirement divided by the number of engine cylinders.

In addition to the intake passages 16, the cylinder head 14 is also formed with exhaust passages 26 for each chamber 15. Exhaust valves 27, which are operated in any known manner, control the communication between the chambers 15 and the exhaust passages 26. An exhaust manifold, indicated schematically at 28 collects the exhaust gases from the cylinder head exhaust gas passages 26 for eventual discharge to the atmosphere.

The engine 11 has an exhaust gas recirculating system, indicated generally by the reference numeral 29, for returning a portion of the exhaust gases from the exhaust manifold 28 back to the chambers 15 through the induction system. The exhaust gas recirculating system includes a conduit 31 which is in communication with its inlet end with the exhaust manifold 28 and which is divided into two branch passages 32 and 33 which rejoin at a conduit 34 which forms the inlet to a vacuum operated exhaust gas recirculation valve, indicated generally by the reference numeral 35. From the valve 35 the exhaust gases pass through a conduit 36 which terminates in the valve plate 23 at a passage 37. Passage 37 meets with a channel 38 formed in the intake side of the cylinder head 14. Individual passages 39 extend from the channel 38 to each of the intake passages 16 adjacent the heads of the respective intake valves 17. Thus, the exhaust gases will be recirculated into the chambers 15 through the intake valve 17 when they are opened.

The exhaust gas recirculation valve 35 is, as has been noted, operated in response to induction system vacuum and for this purpose includes an actuating portion 41 that has an internal chamber which is exposed to induction system pressure via a conduit, indicated schematically at 42, which communicates with a port 43 in the carburetor primary barrel just upstream of the idle position of the primary throttle valve 19. The operation is such that when the engine is idling and the throttle valve 19 is in its idle position, the port 43 will be exposed to atmospheric pressure. Under this condition, the valve 35 will close and there will be no exhaust gas recirculation. When the throttle valve 19 is opened to a predetermined degree, the port 43 will sense intake manifold vacuum and the valve 35 will open so as to effect exhaust gas recirculation.

If desired, an EGR amplifier of a known type, illustrated schematically at 44 may be positioned in the conduit 42 so as to assist in the control of the valve 35. The amount of gas recirculation will be dependent to a large degree upon the induction system vacuum and the combined operation of the EGR amplifier 44 and the EGR valve actuator 41. Although these units normally cooperate in such a manner so as to try to maintain an increased amount of exhaust gas recirculation at higher engine speeds, the desired amount of exhaust gas recirculation is difficult to achieve particularly due to the high temperature of the exhaust gases and, accordingly, the reduced density thereof.

In order to obviate the aforenoted problems, a heat exchanger or cooler indicated generally by the reference numeral 45 is provided by the branch conduit 32. The cooler 35 will have the effect of cooling the portion of exhaust gases flowing through the conduit branch 32 and, accordingly, reducing their density.

The amount of exhaust gases flowing through the cooler 45 is controlled by a valve indicated generally by the reference numeral 46. The valve 46 includes a valve element 47 that is operated by a vacuum actuator, indicated generally at 48. The vacuum actuator 48 has a chamber that is exposed to induction system vacuum downstream of the throttle valves 19 and 21 of the carburetor 18. For this purpose, a conduit 49 extends from the vacuum actuator chamber to a port 51 that is positioned in the secondary barrel of the carburetor 18 downstream of the secondary throttle valve 21. When intake manifold vacuum is high, and accordingly engine load is low, the valve element 47 will be closed and substantially no cooling of the exhaust gases will occur. If the load on the engine increases, the vacuum at the port 51 will decrease and the valve element 47 will open so that exhaust gases may flow through the cooler 45 before introduction into the chamber 16.

If desired, the control valve 46 may be placed in the conduit 32 upstream from the cooler 45 rather than downstream as in the illustrated embodiment. This alternative location is indicated by the phantom line 52.

Rather than employ a control valve in the conduit with the heat exchanger, a dual function valve may be provided for controlling the proportion of flow between the cooled and uncooled conduits. Such an embodiment is shown in FIG. 3.

Figure 3:
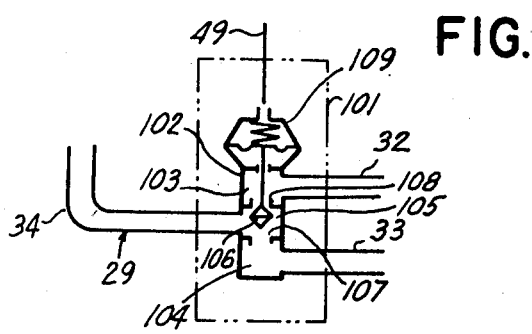
FIG. 3 is a schematic cross-sectional view showing another type of control valve which may be used with the embodiment of FIGS. 1 and 2.

In the embodiment of FIG. 3, only the valve and its cooperation with the conduits 32, 33 and 34 is illustrated. The valve is indicated generally by the reference numeral 101 and includes a housing 102 that has a chamber 103 in communication with the cooled conduit 32 and a chamber 104 in communication with the uncooled conduit 33. The chambers 103 and 104 are positioned on opposite sides of a chamber 105 which is in communication with the outlet conduit 34 that leads to the EGR valve (not shown).

A double acting valve element 106 is provided in the chamber 105 and coacts with seats 107 and 108 that communicate the chamber 105 with the chambers 104 and 103, respectively. A vacuum actuator 109 is provided for operating the valve element 106. The vacuum actuator 109 is connected to the conduit 49 so as to be operated in response to induction system pressure. When intake manifold vacuum is high, the valve element 102 will be drawn upwardly to close the valve seat 108 and upon the valve seat 107 so that uncooled exhaust gases will be recirculated. As the intake manifold vacuum decreases, the valve element 106 will move downwardly to increase the portion of cooled exhaust gases recirculated and decrease the amount of recirculation of uncooled exhaust gases.

Figure 4:
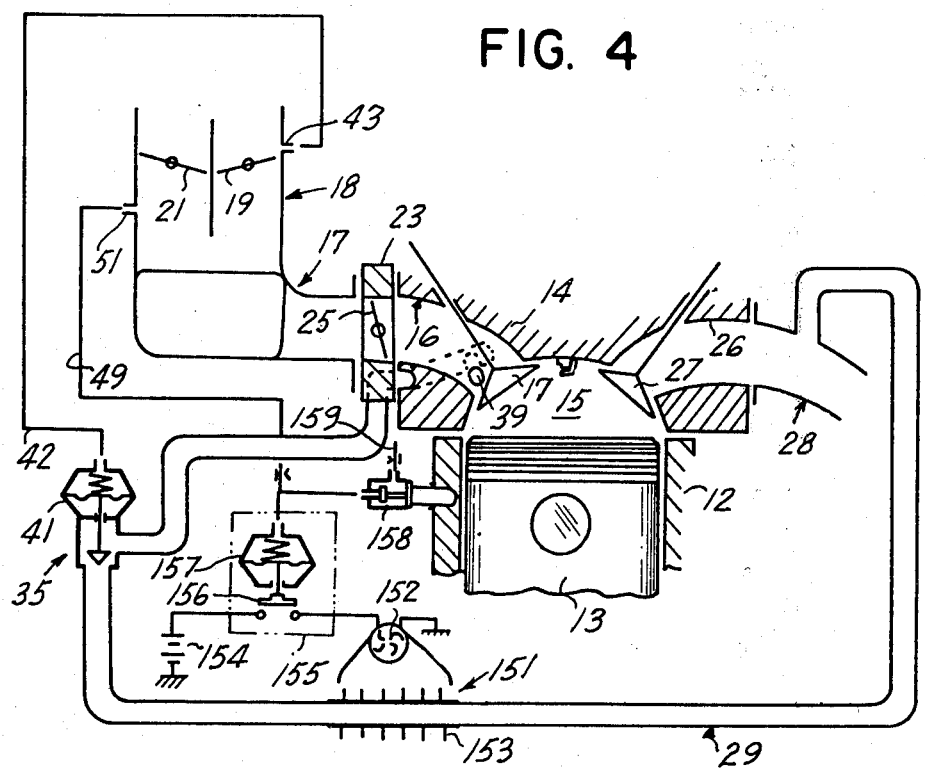
FIG. 4 is a schematic cross-sectional view, in part similar to FIG. 1, showing a still further embodiment of the invention.

Still another embodiment of this invention is illustrated in FIG. 4. In connection with this embodiment, only a single conduit interconnects the exhaust manifold 28 with the EGR valve 35. A heat exchanger indicated generally by the reference numeral 151 is provided around the conduit interconnecting the exhaust manifold 28 with the EGR valve 35. An electrically deriven blower 152 is provided in the heat exchanger 151 so as to provide a cold air flow across fins 153 formed around the heat exchanger portion of the conduit. The fan 152 is in circuit with a battery, indicated schematically at 154, via a pneumatically operated switch 155 which has a contact 156 that is operated by a vacuum actuator 157. The vacuum actuator 157 is operated in the same manner as the actuator 109 of the embodiment of FIG. 3 and the actuator 48 of the embodiment of FIGS. 1 and 2. That is, when intake vacuum is high, the switch conductor 155 will be opened and the fan 152 will not be driven. Thus, uncooled exhaust gases will be recirculated. As the load increases and manifold vacuum decreases, the switch 154 will close and energize the fan 152. Thus, cooling of the recirculated exhaust gases will occur.

A device is also incorporated for controlling the amount of exhaust gas recirculation cooling in response to the temperature of the engine. In connection with the embodiment of FIGS. 1 and 2, this is accomplished by means of a temperature responsive valve 53 that is positioned in temperature sensing relationship to a portion of the engine such as the cylinder block 12. The valve 53 selectively opens an atmospheric vent 54 when the temperature of the engine exceeds a predetermined value. Thus, the pressure in the line 49 line be further reduced to effect a greater degree of opening of the valve element 47.

In order to control the operation of the valve element 47, a restriction $T_1$ is placed in the line 49 between the port 51 and the vacuum actuator 48. A restriction $T_2$ is also provided in the atmospheric vent line 54. The operation is such that when the engine temperature is below a predetermined value, such as normal operating temperature, the valve 53 will be closed and the valve element 47 will be positioned, as previously described, in response to intake manifold vacuum. At low loads and high vacuums the valve element 47 will be closed and there will be no recirculation of cooled exhaust gases. At maximum load, however, the valve element 47 will move to approximately half open position so that there will be some cooling of recirculated exhaust gases at high loads even when the temperature of the engine is below a predetermined temperature.

On the other hand, when the engine 12 reaches the predetermined temperature the valve 53 will open the atmospheric vent 54. The size of the restrictions $T_1$ and $T_2$ is chosen so that the valve element 47 will be approximately half open when the engine is operating at low load. Thus, there will be some exhaust gas recirculation under this condition. As the load on the engine increases, the actuator 48 will cause the valve element 47 to move fully open and a large proportion of the exhaust gases recirculated will be cooled.

It should be readily apparent that the temperature responsive valve of the embodiment of FIGS. 1 and 2 may also be incorporated with the controlling valve as shown in FIG. 3 to achieve the same result.

An engine temperature responsive control is also provided for the fan cooled embodiment of FIG. 4. In connection with this embodiment, a valve 158 is positioned in temperature sensing relationship to the cylinder block 12 and selectively opens an atmospheric vent 159 when the temperature of the engine is above a predetermined temperature. As with the embodiment of FIGS. 1 and 2, restricted orifices $T_1$ and $T_2$ are provided in the lines 49 and 159 for controlling the sequence of operation.

In accordance with this embodiment of the invention, when the engine is below its normal operating temperature or the predetermined temperature at which the valve 158 is actuated, the fan 152 will be energized at a higher load than when the valve 158 is actuated so as to open the atmospheric vent 159. Thus, the cooling of the exhaust gases will occur at a higher load when the engine is warm than when it is cold.

It should be readily apparent from the foregoing description that several embodiments of the foregoing invention have been described each of which is effective to more accurately control the amount of exhaust gas recirculation by reducing the density of the recirculated exhaust gases at elevated loads and temperatures. Thus, the matching of the amount of exhaust gas recirculation in relation to engine load may be more accurately controlled. It is to be understood that various changes and modifications may be made from the spirit and scope of the invention as defined by the appended claims.

What is claimed is:

1. In an internal combustion engine having a chamber of variable volume in which combustion occurs, an induction system for delivering a charge to said chamber, an exhaust system for exhausting spent exhaust gases from said chamber, and an emission system for recylcing at least a portion of products generated during the operation of said engine and returning said products to said chamber, the improvement comprising means responsive to the load of said engine for cooling said products prior to return to the chamber.

2. An internal combustion engine as set forth in claim 1 wherein the degree of cooling of the products is also related to engine temperature.

3. An internal combustion engine as set forth in claim 1 wherein the products are cooled by passing at least a portion of them through a heat exchanger.

4. An internal combustion engine as set forth in claim 3 wherein not all of the products are passed through the heat exchanger, the uncooled products being remixed with the cooled products prior to introduction to the chamber.

5. An internal combustion engine as set forth in claim 3 further including an electrically driven fan for cooling the heat exchanger.

6. An internal combustion engine as set forth in any one of the preceding claims wherein the products returned to the chamber constitute a portion of the exhaust gases.

7. An internal combustion engine as set forth in claim 6 wherein the means responsive to the load of the engine includes a pressure responsive member responsive to pressure in the induction system downstream of a flow controlling throttle valve therein.

* * * * *